United States Patent [19]
Scrudato et al.

[11] Patent Number: 6,045,707
[45] Date of Patent: Apr. 4, 2000

[54] ELECTROCHEMICAL PEROXIDATION OF CONTAMINATED LIQUIDS AND SLURRIES

[75] Inventors: Ronald J. Scrudato, Oswego; Jeffrey R. Chiarenzelli, North Rose, both of N.Y.

[73] Assignee: The Research Foundation of State University, Albany, N.Y.

[21] Appl. No.: 09/157,920

[22] Filed: Sep. 21, 1998

[51] Int. Cl.$^7$ .............................. C02F 1/461; C02F 1/72
[52] U.S. Cl. ..................... 210/748; 210/759; 205/755; 205/761
[58] Field of Search .................... 210/748, 759, 210/747, 763, 198.1, 199, 205, 243; 205/742, 755, 761; 204/275

[56] References Cited

U.S. PATENT DOCUMENTS

| | | | |
|---|---|---|---|
| 4,131,526 | 12/1978 | Moeglich | 204/149 |
| 4,604,214 | 8/1986 | Carr et al. | 210/759 |
| 4,624,792 | 11/1986 | Yamanaka et al. | 210/959 |
| 4,693,833 | 9/1987 | Toshikuni | 210/759 |
| 4,834,852 | 5/1989 | Wabner | 210/748 |
| 5,068,038 | 11/1991 | Fischer et al. | 210/691 |
| 5,368,703 | 11/1994 | Brewster | 204/149 |
| 5,520,483 | 5/1996 | Vignieri | 210/747 |
| 5,525,008 | 6/1996 | Wilson | 405/52 |
| 5,538,636 | 7/1996 | Gnann et al. | 210/631 |
| 5,716,528 | 2/1998 | Jasim et al. | 210/668 |

FOREIGN PATENT DOCUMENTS

| | | | |
|---|---|---|---|
| 60-93999 | 5/1985 | Japan | 205/761 |

OTHER PUBLICATIONS

G. Veith and L. Kiwus Bulletin of Environmental Contamination and Toxicology, vol. 17, 631–636, 1977.

Scrudato, R.J. and Chiarenzelli J.R., Electrochemical Peroxidation of PCBs and VOCs in Subsurface Storage Tank Water and Slurry. Environmental Applications of Advanced Oxidation Technologies, Proceedings of the second International Symposium. pp. 4–77 to 4–89 (Sep. 1997).

Scrudato, R.J. and Chiarenzelli J.R., Electrochemical Peroxidation of Contaminated Liquids and Solids (May 13, 1998).

Scrudato, R.J. and Chiarenzelli J.R., Destruction of Organic Contaminants by Electrochemical Peroxidation (ECP) Third International Conference on Advanced Oxidation Technologies for Water and Air Remediation, (Oct. 26–29, 1996).

Scrudato, R.J. and Chiarenzelli J.R., Photocatalytic Degradation of Contaminated Sediments. Third International Conference on Advanced Oxidation Technologies for Water and Air Remediation, (Oct. 26–29, 1996).

Scrudato, R.J. and Chiarenzelli J.R., Steam Extraction Combined with Electrochemical Peroxidation to Degrade Organically Contaminated Sediments. Fourth International Conference on Advanced Oxidation Technologies for Water and Air Remediation, (Sep. 23–26, 1997).

Scrudato, R.J. and Chiarenzelli J.R., Electrochemical Peroxidation of PCBs and VOCs in Superfund Site Water and Sediments. (Environmental Research Center, SUNY at Oswego) (Sep. 1997).

Scrudato, R.J. and Chiarenzelli J.R., Development of Advanced Oxidation Processes for Decontamination of PCB–Contaminated Media. (Jan. 1996).

*Primary Examiner*—David A. Simmons
*Assistant Examiner*—Frank M. Lawrence
*Attorney, Agent, or Firm*—Salzman & Levy

[57] ABSTRACT

A process has been invented for the purpose of decontaminating aqueous media derived from industrial wastestreams, sanitary wastestreams and natural sources. The aqueous media may contain solids in the form of sediment, soil or sludge. Contaminants include organic materials such as phenols, nitro containing compounds, PCBs, VOCs, PAHs, dyes; inorganic materials, including radionuclides, organometallic materials and microorganisms. Purification of the contaminated media is obtained by using an Electrochemical Peroxidation process (ECP), by which heated hydrogen peroxide is added to an electrolytic cell having oscillating current passing through large surface area sacrificial iron containing electrodes.

20 Claims, 4 Drawing Sheets

ELECTROCHEMICAL PEROXIDATION OF CONTAMINATED LIQUIDS AND SLURRIES

TECHNICAL FIELD

There is a growing concern about the quality of the environment and the impact that man is making upon it. Mankind has disrupted the natural order of the environment by fundamentally altering the equilibrium of microscopic and macroscopic ecosystems through introduction or concentration of contaminants of various types including; industrial waste streams and sanitary waste streams comprising organic and inorganic compounds, pathogenic organisms or radioisotopes. Industrial waste streams can include wood pulp effluent, plating effluents, spent pickle brine, discharges from chemical facilities, steel mills or oil refineries. These waste streams may be highly toxic and hazardous or simply impact the quality of life by being malodorous or creating unwanted coloration. Under best case scenario, where manufacturing processes are tightly controlled, these waste streams can be treated to reduce their impact on the environment. Typically this is performed as the last step in the manufacturing operation. However, worst case scenarios such as releases due to spills can have a devastating impact to the environment especially with regard to groundwater or soil. Under these circumstances it is essential that remediation be performed rapidly and preferably in situ to minimize disturbances to the ecosystem. It is therefore desirable to design a process that will decontaminate a variety of pollutants under such diverse situations as routine manufacturing processes or catastrophic environmental pollution of groundwater or soils. This invention relates to the use of novel Electrochemical Peroxidation processes (ECP) comprising heated hydrogen peroxide and an iron source in combination with an alternating current electrolytic source for the purpose of decontaminating aqueous media optionally containing particulate matter.

BACKGROUND OF THE INVENTION

With the continued concern regarding the quality of the environment, industry, government, and academia have joined forces to find methods of treating various forms of contamination for the purpose of minimizing their impact on the environment. Methods that have been described in the past include bioremediation, such as bacteria that consume hydrocarbons, however these processes tend to be expensive, very selective, complex, slow and typically can't handle the more difficult "refractory" materials such as polyhalophenols. Physicochemical processes such as extraction, adsorption, stripping, evaporation, and flocculation and precipitation have been employed for the purpose of decontamination, but in some cases the contaminated media must be removed from the site and further treatment required. These processes also tend to be energy inefficient. Lastly, chemical treatment of contaminated media, such as the use of chlorine, chlorine dioxide, ozone, and "per" compounds such as potassium permanganate, have been employed to treat contaminated media. However, these treatments utilize hazardous materials, do not necessarily generate innocuous intermediate or end products, and are typically expensive.

One form of chemical treatment that has shown promise as a viable decontaminating system is Fenton's Reagent. Fenton's Reagent is comprised of hydrogen peroxide and ferrous salts, the latter react with hydrogen peroxide to generate hydroxide radicals. These radicals are powerful oxidizing agents and will react with a plethora of materials that are amenable to oxidation decomposition. In the case of organic materials the process will generate carbon dioxide and water. Examples of contaminants include, organic dyes, nitrocresols, chlorinated phenols, formaldehyde, hydrocarbons such as gasoline fuel, AOX aromatic compounds such as BTEX (benzene, ethylbenzene, toluene, and xylene), chlorinated hydrocarbons including PCBs and dioxins, organic acids, organometallic compounds containing metals such as lead, mercury, copper, chromium and others, insecticides, fungicides, microorganisms including E. coli and various viruses, bacteria and pathogens, miscellaneous waste streams, and groundwater containing high levels of carbon oxygen demand (COD) and biological oxygen demand (BOD-5) materials. Both COD and BOD-5 materials are not necessarily toxic, per se, but their oxygen consumption in lakes and streams lowers the natural oxygen level to the point where flora, fauna, and aquatic life cannot survive.

Although Fenton's Reagent can be used to treat a wide range of contaminants, it suffers from several well known drawbacks including formation of iron sludges which either must be further treated or handled in a prudent manner to prevent leaching/dissolution. Furthermore, hydrogen peroxide is expensive and is inherently unstable when maintained at elevated temperatures for long periods. Lastly, the decontamination process using Fenton's Reagent is slow, sometimes requiring elevated temperatures and resident times from one-half to five hours as reported by Yamanaka et al, U.S Pat. No. 4,624,792; Toshikuni et al, U.S. Pat. No. 4,693,833; and Carr et al, U.S. Pat. No. 4,604,234. Various techniques have been employed to speed the decontamination process when using Fenton's Reagent including supplying electrical energy or electromagnetic radiation. The problem of using electromagnetic radiation (typically in the ultraviolet region) is it cannot be used as a bulk treatment since radiation absorption occurs especially at the surface. Therefore, large amounts of surface area are required and even in these cases the process is inefficient and costly.

U.S. Pat. No. 4,131,526 to Moeglich et al discloses use of an electrolytic cell to decontaminate oxidizable contaminants. Oxidation takes place using alternating current that is varied within the range of 0.5 to 800 Hertz. Below 0.5 Hertz, Moeglich reports that fouling of the electrodes occurs, limiting the life of the process. The electrodes used by Moeglich include stainless steel, graphite, titanium coated with ruthenium dioxide or manganese dioxide, amorphous carbon and platinum. Moeglich prefers using a central electrode made of graphite surrounded by a stainless steel mesh electrode. As further required by the process, oxidizing catalysts are added to the electrolytic cell as powders of metal oxides of Group IVa, Va, VIb, and VIIb including, germanium, tin, lead, antimony, bismuth, chromium, molybdenum, tungsten, manganese, and rhenium. These powders are incorporated onto carrier particles which are then added to the cell. Due to this design, it is preferred that no large solid particles be present because they could interfere with the cell operation by causing plugging. In the practice of U.S. Pat. No. 4,131,526, the amount of insolubles, other than in a colloidal phase, must be held to less than 1% and most preferably less than 100 ppm. The invention also relates to the production of hydrogen peroxide which may be consumed in the oxidation of oxidizable compounds in the aqueous medium. This invention suffers from the required use of expensive metal oxides preferably on carrier particles. In one embodiment, these particles are in a fixed bed limiting contact with the bulk of the contaminated waste stream or effluent, thereby reducing efficiency.

Wabner, in U.S. Pat. No. 4,834,852 describes another electrolytic cell having a direct current density of 0.5 to 50 mA/cm2, where hydrogen peroxide in the range of 0.5 to 10 mg/L per COD unit is employed as the oxidant for conversion of degradable or toxic substances. The cathode of the dielectric cell is made of special steel, titanium, nickel or graphite. The anodes can be graphite or dimensionally stable valve metal anodes (DSA). It is a feature of the invention that the electrodes have a sufficiently long useful lifetime (i.e. do not dissolve under processing conditions). No metal or metallic salts are added as a catalyst, so this process, although utilizing lower levels of hydrogen peroxide, is inherently slow.

Fischer, et al, in U.S. Pat. No. 5,068,038 addresses the problem of ferric hydroxide sludge formed during the decontamination process by using silicic acid having a specific surface area above 50 m2/gm as a second adsorption means. Approximately 20–1000 mg/L of ferrous salts are required to be added during the oxidation process. Although increased efficiency of decomposition of AOX is obtained, the system still generates a ferric hydroxide sludge which requires further decontamination before discarding.

Vignieri in U.S. Pat. No 5,520,483, teaches the in situ remediation of groundwater contamination using Fenton's Reagent. The process as described requires the lowering of the pH of the contaminated media with acetic acid at a flow rate of 5–10 gallons/minute (GPM). The total amount of acetic acid is typically 1–3% by volume of the effective volume of the contaminated water. Ferrous ion solution is also added at 0.5–3%, by volume, of the effective volume of the contaminated water. Lastly, hydrogen peroxide is added at 1–5%, by volume, of the effective volume of the contaminated water. Potable water must also be injected into the wells between addition of the three components to allow for a sufficient plume to develop for the process to work effectively. A plurality of wells must also be used to ensure significant decomposition. No use of electrolytic amplification was contemplated by Vignieri. The process as described does not actively disperse the hydrogen peroxide and consequently the hydrogen peroxide can remain close to the injection wells and can result in explosive concentrations. Second, diffusive methods require a long time for the reagents to diffuse and therefore the remediation process is slow to complete.

Wilson, in U.S. Pat. No. 5,525,008 obviates the impediments in Vignieri, U.S. Pat. No. 5,520,483 by gas pressure injecting through a single or plurality of injectors the oxidizing agents into the soil as well as the groundwater. Under these conditions diffusion is rapid and increased by the evolution of gases such as CO2, air or oxygen. Successful remediation of the affected area was reported to be obtained over the course of a week. Furthermore, no electrolytic augmentation of the oxidative decontamination was contemplated by Wilson, et al.

Gnann, et al, in U.S. Pat. No. 5,538,636 addresses the issue of ferric hydroxide sludge, formed as a by-product during the oxidative decontamination of highly contaminated wastewaters when using Fenton's Reagent. A process is disclosed that eliminates the sludge by electrolytically treating the sludge to reduce the ferric salts back to ferrous salts. This allows for recycling the ferrous salts back into the oxidative process thereby minimizing sludge waste. The oxidative process is performed using anodes that are dimensionally stable (e.g. titanium, platinum, and metal oxides), while cathodes are composed of steel mesh or carbon. Preferably the molar ratios of COD/H2O2/Fe are in the range of 20/20/1 to 20/10/5. The regeneration process for converting ferric hydroxide to ferrous salts requires several steps to be performed including precipitation of the ferric salts with soda lime. This is followed by separation of the treated wastewater using a side channel pump and feeding it through a PE crossflow filter. The time required for these processes can be as long as 6 hours and requires careful balancing of the steps in order to have a viable process.

Jasim, et al, in U.S. Pat. No. 5,716,528 describes the treatment process for wood preservative effluents comprising chlorinated phenols and polynuclear aromatic hydrocarbons (PAH). Jasin et al teaches that hydrogen peroxide, and ferrous salts, in acidic media, can be used to decompose wood preservative effluents. The weight ratio of hydrogen peroxide to COD is within the range of 0.9:1 to 1.25:1 and the concentration of ferrous ion is suitably about 5% based on hydrogen peroxide weight. The best results for the decontamination process are at elevated temperatures, approximately 40 C but at this temperature decomposition of hydrogen peroxide occurs. Precipitation of ferric hydroxide is necessitated because high levels of hydrogen peroxide and thereby ferrous salts are used to treat the concentrated effluent. For greatest degree of destruction of pentachlorophenol, a ratio of peroxide to pentachlorophenol of 27:1 is required, however for unsubstituted phenol, the ratio is 3:1. Reaction times are reported between 3 to 3.5 hours and no electrolytic augmentation was contemplated.

The examples hereinabove describe the current technology for hydrogen peroxide oxidative decomposition of various aqueous waste streams. A common problem throughout the prior art is that when ferrous salts are used in appreciable quantities, the additional treatment step to remove ferric salts is required to make the process environmentally acceptable. Furthermore, augmentation of Fenton's Reagent in oxidative decontamination processes by the use of electrolytic energy can enhance the rate of the decontamination process but problems exist with fouling of the electrodes and the requirement that the electrodes be made of materials that are essentially inert to the process thereby requiring fairly expensive materials to be used. Other important attributes for a process of detoxification or decontamination should include:

a) ability to treat various types of contaminants,
b) rapid processing of less than one minute
c) cost efficient,
d) energy efficient,
e) high throughput,
f) safe to operate, and
g) the process itself should generate minimal wastestreams requiring limited further treatment
h) no toxic intermediates
i) elimination of iron salts, and
j) no need to adjust pH.

SUMMARY OF THE INVENTION

This invention relates to the use of heated hydrogen peroxide in the presence of a low amperage AC or oscillating DC current through sacrificial iron electrodes for the general decontamination of liquids, slurries, and sludges, surface and groundwater, soils and sediments contaminated by organic, and/or inorganic substances, including select radionuclides, and/or microbes. This invention has also been used to effectively decolorize organically based dyed liquids and solids. An advantage of this invention is that it can be used to decontaminate a wide range of contaminants as part of a standard manufacturing process or can be used in situ where contamination of the environment has occurred. The specific types of contaminants or pollutants that can be degraded by the subject invention include non-aromatic chlorinated hydrocarbons, aromatic chlorinated hydrocarbons including PCBs and dioxins, aromatic and non-aromatic hydrocarbons, organic acids, phenols, nitrogen containing compounds, contributions to the total Biochemical Oxygen Demand (BOD) and the Chemical Oxygen Demand (COD), organometallic compounds including compounds of lead, mercury, copper, chromium and others, insecticides, pesticides, fungicides, and microorganisms including *E. coli*, and various other viruses, bacteria and pathogens. A further advantage of this inventive process is that it is extremely rapid and requires minimal quantities of energy and materials. Yet another advantage of the invention is that minimal quantities of ferric hydroxides are generated during the decontamination process and therefore no further treatments due to formation of flocculated materials are required.

BRIEF DESCRIPTION OF THE DRAWINGS

A complete understanding of the present invention may be obtained by reference to the accompanying drawings, when considered in conjunction with the subsequent detailed description, in which:

FIG. 2b illustrates a cross-sectional view of the electrochemical peroxidation reactor as viewed from line 2b—2b in FIG. 2a.

DETAILED DESCRIPTION OF THE INVENTION

The process utilizes a series of large surface area cast iron or mild steel electrodes to induce an oscillating low amperage AC or DC current to create an electrical field in an aqueous liquid containing organic, inorganic contaminants and/or microbes or mixed wastes including select radionuclides, to which heated hydrogen peroxide is added and comes in contact with zero valent iron on the iron electrodes and dissolved iron ions produced by the dissolution of the sacrificial iron or steel electrodes. In the treatment of solid slurries, a co-solvent at a concentration of <0.05% can be used to increase the aqueous phase concentration of the target compounds to be degraded. The Electrochemical Peroxidation (ECP) process can, for example, be used to regenerate granular activated carbon (GAC). An AC or oscillating (variable frequency) DC current is induced through a series of cast iron or mild steel electrodes to create a flux of electrons between the electrode surfaces to generate ferrous ion. The AC or oscillating DC current also serves to increase the reactive surface areas of the electrodes and keeps the electrodes clean and free from fouling. Organic compounds, especially PCB's and metal/organic complexes can be adsorbed by the electrode surfaces and are degraded as a result of the redox reactions as iron is dissolved and oxidized from zero valent to ferrous ion from the electrodes. The cast iron or mild steel electrodes are sacrificial and provide a continuous source of dissolved ferrous ion to the aqueous system undergoing treatment. The flux of the electrons created by the electrical current affects the degradation of the organic contaminants adsorbed to the electrode surfaces as well as within the treated liquid. Based on experimentation the low amperage current induces a flow of electrons into the liquid or solid suspension creating micro-zones or micro-environments of modified pH and Eh in the proximity of the electrode surfaces. The characteristics of the micro-zones or environment, having altered Eh and pH, are determined by the spacing and design of the electrodes. It is the intent of this invention to use multiple, large surface area electrodes in order to maximize the number of sites of these micro-zones. These micro-zones create an environment that synergize the activity of the hydrogen peroxide and therefore it is beneficial to inject the hydrogen peroxide from multiple sites in order to gain maximal advantage of the micro-zones. The micro-environments so created, having significantly enhanced the activity of the hydrogen peroxide, eliminate the prior art need for modification of the pH with organic or inorganic acids. It is preferred, however, that the waste stream have a pH <5.3 units to enhance iron and associated trace metal solubility and to increase the conductivity of the material being treated. An additional benefit of the invention is that the large area sacrificial electrodes, having facilitated adsorption of organic materials, create a higher concentration of the contaminants in the locale of the micro-zones, thus increasing the rate of their decomposition.

A remarkable and unexpected result is that if heated hydrogen peroxide solution is utilized, the speed of the decontamination process is enhanced over the ambient rate to the same extent as if the entire waste stream were heated to that temperature. This is extremely beneficial in situations where in situ remediation is required. The heated hydrogen peroxide reacts with the zero valent iron on the surface of the electrode to generate a flux of free and organic radicals capable of degrading organic compounds and destroying microbes including *E. coli* bacteria. Therefore, under the inventive conditions decontamination rates are very high and minimal hydrogen peroxide is required. The hydrogen peroxide is maintained at very low concentrations in the decontamination vessel, typically <100 ppm, this is desirous since it is known that high concentrations of hydrogen peroxide are unstable and can decompose violently. Additionally, free radicals degrade hydrogen peroxide therefore reducing the efficiency and effectiveness of the process. Low concentrations of hydrogen peroxide are added as a continuous stream over a period of time or in spurts, in both cases the addition should be made through a plurality of sites to generate maximal micro-zones. Using this process mixed wastes containing trace metals, radionuclides and organic materials can be treated together. Furthermore, due to the low amperage conditions, little ferric hydroxide sludge by-product is generated. A preferred embodiment of the current invention limits the amperage range to maintain concentrations of ferrous iron that would be below the solubility limit of the ferric hydroxide salts. When AC low amperage current is used this also allows the ferric ion to be reduced at both electrodes, thereby facilitating recycling back to the ferrous ion in the locale of the microenvironment. In this manner concentrations of ferrous ions can be maintained at levels sufficient for the degradation process to proceed rapidly, yet still keep the ferric ion concentration at sufficiently low levels to avoid the formation of a ferric hydroxide flocculant. Furthermore, it has been shown that the levels of ionic iron can be modulated and controlled by the strength of the electrical current.

The ECP process has been successfully used to degrade PCB's adsorbed to soils, sediments, sludges and in liquids;

petroleum hydrocarbons in ground water and volatile organic compounds (VoCs) in subsurface storage tank water and sludges; and to reduce the total organic compounds (TOC) and biochemical oxygen demand (BOD) of waste waters from a paper manufacturing effluent stream. BOD levels were reduced by more than 35% after three minutes of treatment. This process has also been used to decolorize organic dyes that are used in the production of paper and dyed fabrics. Contaminated sediment and sludge slurries containing up to 25% solids have been successfully degraded using the ECP process where more than 85% of the contaminant has been degraded within 2–5 minutes of exposure. It is known that solids can quench the effectiveness of the generated free radicals from the Fenton Reagent and therefore reduce the effectiveness of the ECP process. In one preferred embodiment of this invention, it is desirable to include a step prior to the oxidative decontamination of sludges and sediments especially containing PCB contaminants. This prestep is performed to desorb the contaminants from the solids to produce a liquid phased system and can consist of a steam extraction or other means of desorption of the PCB laden sediment into an aqueous media and then oxidative decontamination of the resultant extraction. Degradation of contaminants has been further significantly enhanced when co-solvents are used at concentrations <100 ppm; surfactants have also been demonstrated to significantly improve the degradation process for compounds including PCBs, VOCs and select pesticides.

If organo-metallic complexes are part of the waste stream, treatment may beneficially include intentional formation of ferric hydroxide flocculant by increasing the current and thereby generating additional iron. This ferric hydroxide adsorbs the metal salts generated during the decontamination process and can be separated from the liquid to isolate the metal contaminates thereby providing a purified effluent.

The process can be employed either ex situ or in situ depending on the conditions required. Typically, in-process purification will be performed ex situ in a vessel or other containment system as the last step in a manufacturing process. The contaminated liquid or slurry is subjected to mixing or moves through the reactor vessel in a continuous flow depending on whether the process is a batch or continuous process. If mixing is required, this step should proceed for 3–5 minutes. In the treatment of slurries, the reaction vessel can be enclosed or a semi-enclosed apparatus and the process can be operated as a batch reactor or as a continuous flow system. Reactions can occur within five minutes but preferably occur within seconds, and the treated liquids and solid suspensions are then discharged to a settling tank or other solids separating equipment where the material is allowed to settle or separate the associated solids. Once the solids have been removed, the liquid is separated and removed. If ferric hydroxide is formed it can be segregated from the bulk liquid and treated as a concentrated metal waste. The remaining liquid fraction is analyzed and if free of organic or inorganic contaminants, is discharged to the environment.

In the treatment of liquids, a batch or continuous flow reactor can be used to affect the reactions described above. In this application, the difference is that particulate management is not required and the treated liquid can be directly discharged, provided it meets discharge requirements.

The ECP process can also be used as an in situ application to degrade organic contaminants in groundwater and contaminated subsurface soils and sediments. Wells are drilled to intercept the contaminated groundwater and sediment/rocks. It is preferred that wells be chosen that have the proper hydrologic conditions so that there can be recirculation of the treated water back into the well. Within the drill casing, a submersible pump, and dispersing devices deliver heated hydrogen peroxide within an electrical field induced between a multiple series of large surface area cast iron or steel electrodes. Adsorbed contaminants on the large surface area cast iron electrodes are subjected to the electrochemical reactions on the anode and cathode surfaces. Within the electrical field, the reaction of the heated hydrogen peroxide with the zero valent iron electrode produces a flux of free radicals which aggressively attack organic contaminants forming carbon dioxide, water and small amounts of chlorides, provided the contaminants are chlorinated.

The electrodes in the current invention can become coated with a gum or tar after a period of use even though oscillating DC current is used. Should this occur the electrodes are subjected to a high amperage treatment (>10 amps) for a short period of time (<30 seconds). Especially for in situ processes this is desirable since it is then not necessary to remove the reactor from the well.

General working ranges for specific parameters presented in the detailed description of the invention are given hereinbelow, but these should not be construed as limiting the invention;

a) temperature of the contaminated waste stream during decontamination can be between 5 and 70 C, preferably between 5 and 50 C and most preferably between 5 and 35 C, b) voltage across the electrodes should be between 0.1 and 50 volts, preferably 0.25 and 30 volts and most preferably between 0.5 and 15 volts, c) oscillating phase changes of the current should be 0.01 to 10 cycles/second, preferably 0.05 to 5 cycles per second, and most preferably 0.1 to 1 cycles per second, d) amperage values should be between 0.05 to 50 amps, preferably 0.1 to 25 amps and most preferably 0.5 to 10 amps, e) current densities should be in the range of 0.5 to 150 mAmp/cm2, preferably between 1 and 100 mAmp/cm2, and most preferably between 2 and 50 mAmp/cm2, f) temperature of the added hydrogen peroxide solution should be between 20 and 70 C, preferably 30 to 60 C and most preferably between 40 and 50 C, g) co-solvents can be organic low weight alcohols or ketones, preferably methanol, ethanol or acetone, most preferably ethanol, h) surfactants can be either anionic or nonionic, preferably anionic, and most preferably compounds that do not scavenge free radicals, i) the large surface electrodes can be of parallel face geometry or nested pipe design, with a separation of 0.5 to 5 inches, a preferred separation is between 0.5 and 3 inches, and the most preferred separation is between 0.5 and 1.5 inches, j) the surface of the electrodes should be maximized with the use of cast iron or large surface area mild steel plates, and k) the pH of the effluent can be between pH 2 and pH 11, the preferred pH range is between pH 2.5 and pH 8 and the most preferred pH range is between pH 3 and pH 5.3.

The following examples illustrate the invention but are not to be considered as limiting it. Unless otherwise specified, all parts are by weight and all temperatures are in Celius.

EXAMPLE 1

Design of Electrochemical Peroxidation Reactor

Figure 1:
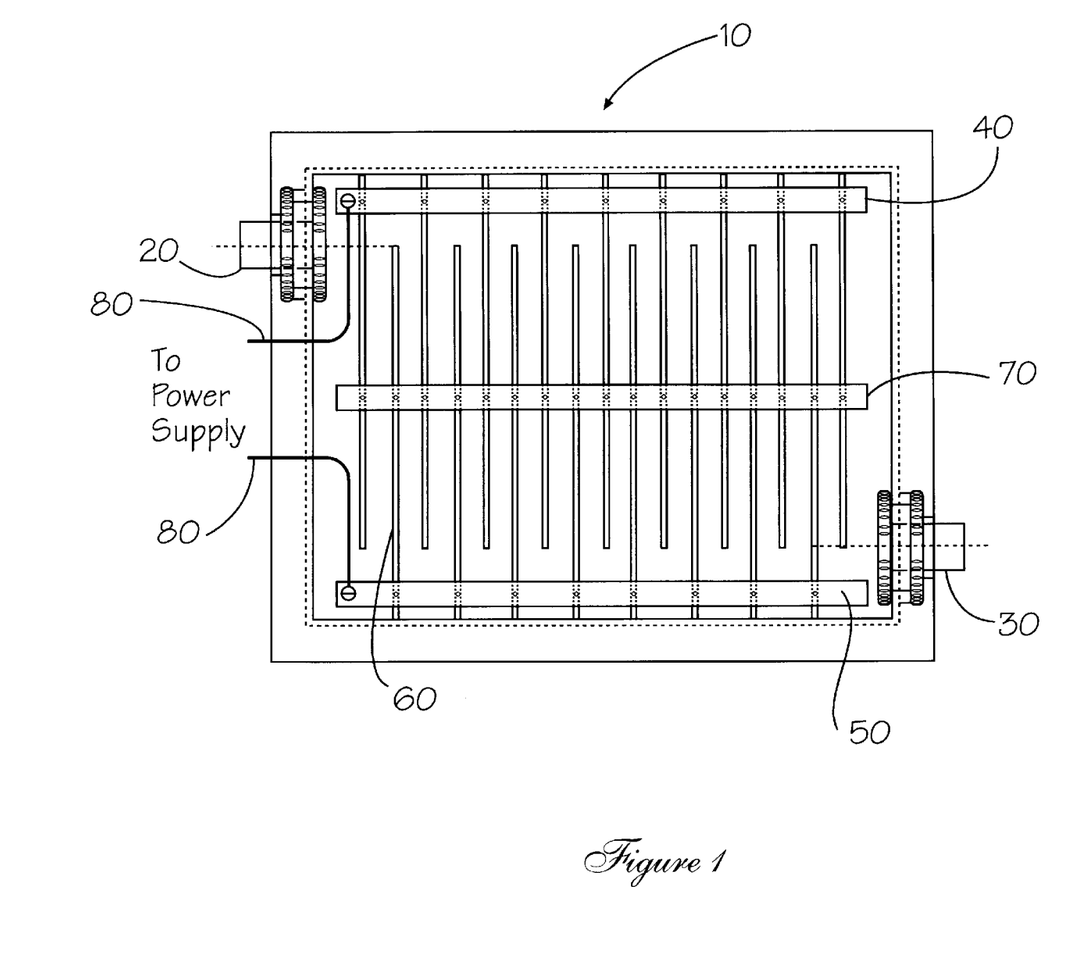
FIG. 1 illustrates a top view of an embodiment of the electrochemical peroxidation reactor of the present invention, prior to placement of the hydrogen peroxide delivery system.

A chemically inert container 10 (FIG. 1) contains two openings at opposite walls of the container. The first opening is an inlet port 20 and the second opening is an exit port 30. Attached to these same sides of the container 10 are three rods: two aluminum buss rods 40 and 50, and a Plexiglas rod 70. Attached in an alternating pattern, are soft steel electrodes 60, the first to the aluminum buss bar 40, the second to the second aluminum bus 50, and so on in an alternating pattern for a total of seventeen electrodes. For stability, the electrodes 60 are attached to a center Plexiglas rod 70. A power supply is attached via # 10 insulated wires 80 to the aluminum buss bar 40 and to the second aluminum bus 50. The combination of rods 40 and 50, electrodes 60 and wires 80 comprise the electrical circuitry for supplying the AC or oscillating DC current to the cell. Effluent to be treated enters in inlet 20, takes a serpentine path between the pairs of electrodes 60, and then exits through exit port 30.

Figure 2A:
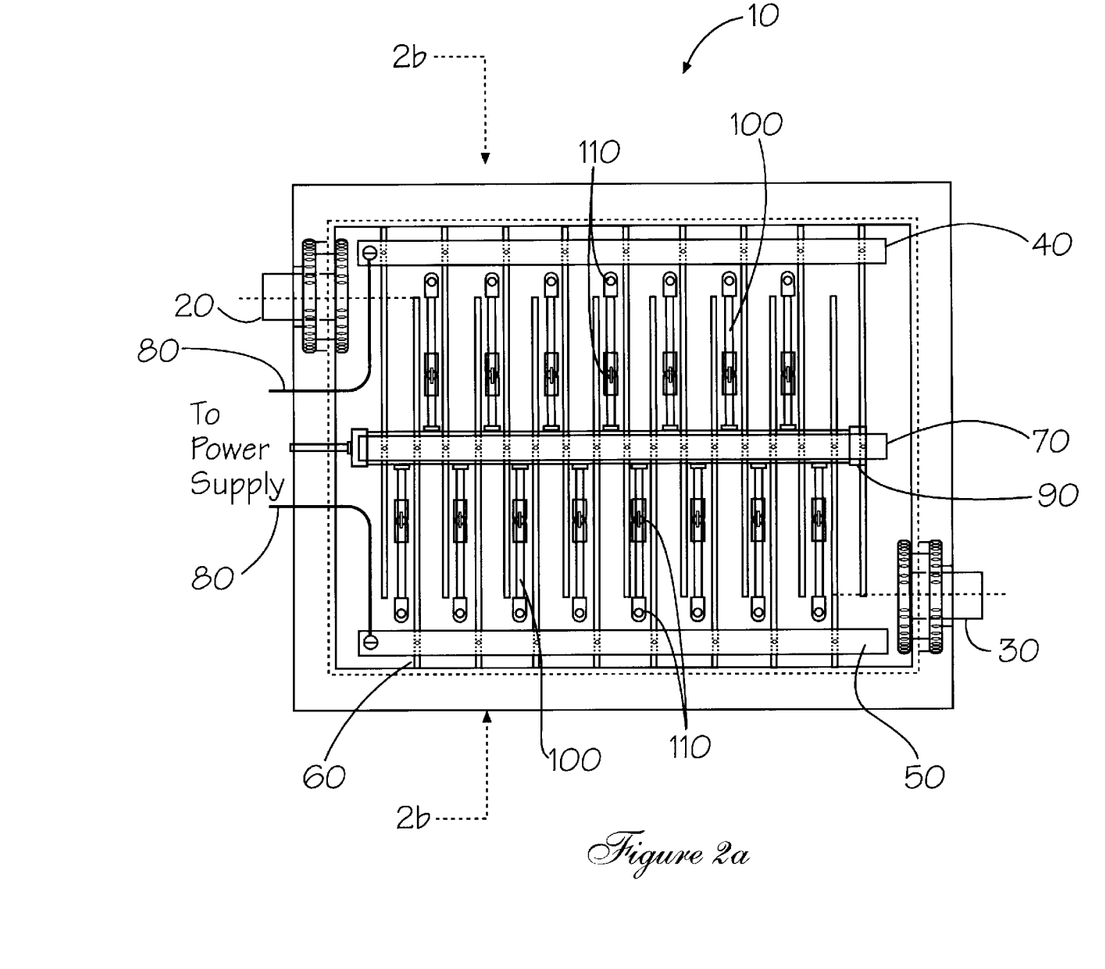
FIG. 2a illustrates a top view of the electrochemical peroxidation reactor after the placement of the hydrogen peroxide delivery system.
Figure 2B:
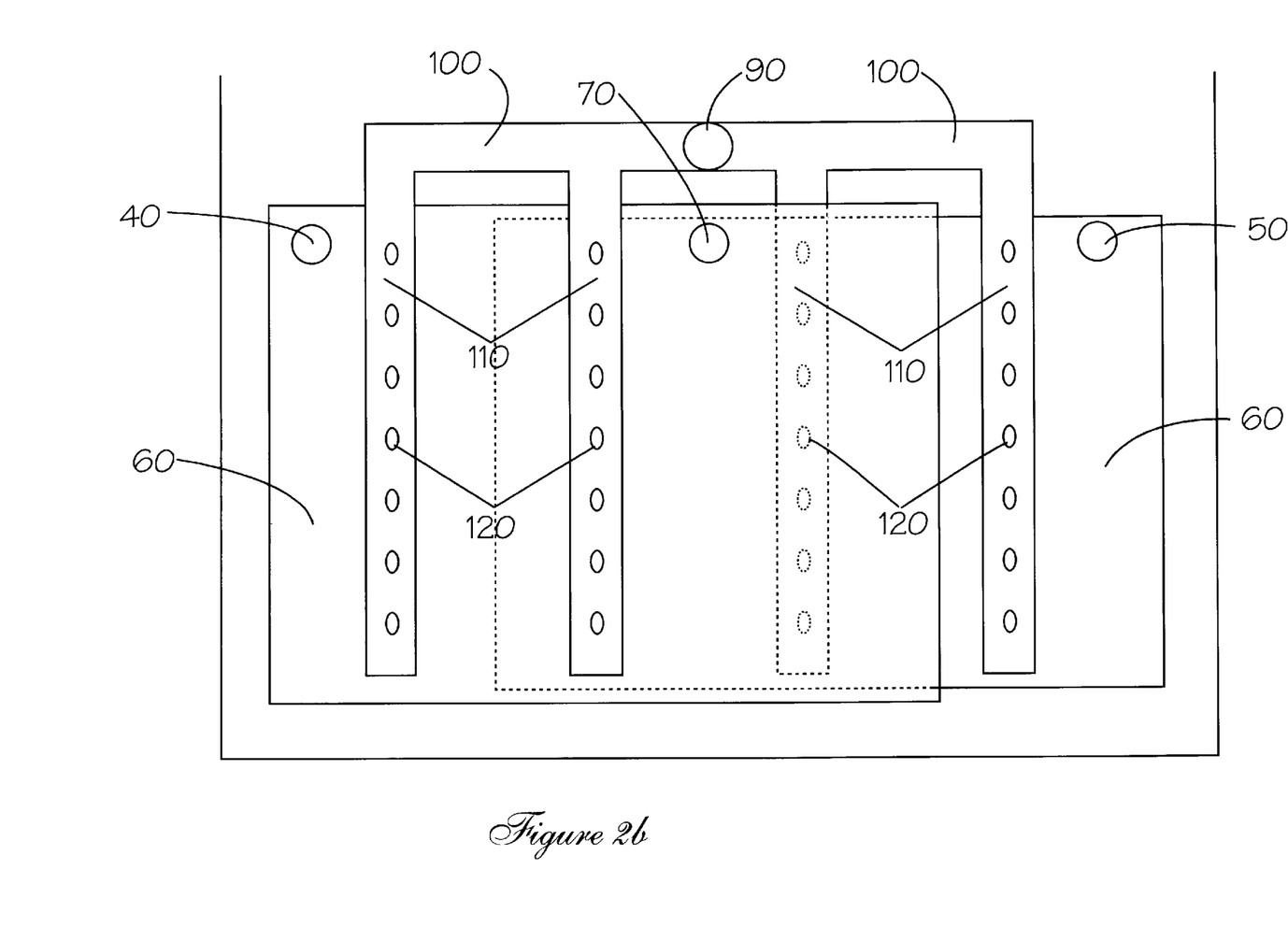

Disposed atop the electrodes, and running in the same direction as both the aluminum buss bar and the Plexiglas rods, 40, 50 and 70 respectively, is a hollow Plexiglas tube 90 (FIG. 2). Attached perpendicularly on alternating sides of the Plexiglas tube 90 are fifteen smaller hollow tubes 100. The smaller hollow tubes 100 are positioned over the space between each electrode 60. Attached to each hollow tube 100 are two vertical tubes 110, which extend to the bottom of the tank. Each vertical tube 110 contains seven small holes 120, equidistant from one another, and sealed at the bottom. The combination of tubes 90, 100 and 110, and holes 120 comprises the delivery system for the heated hydrogen peroxide solution to come in contact with the contaminated effluent.

Figure 3:
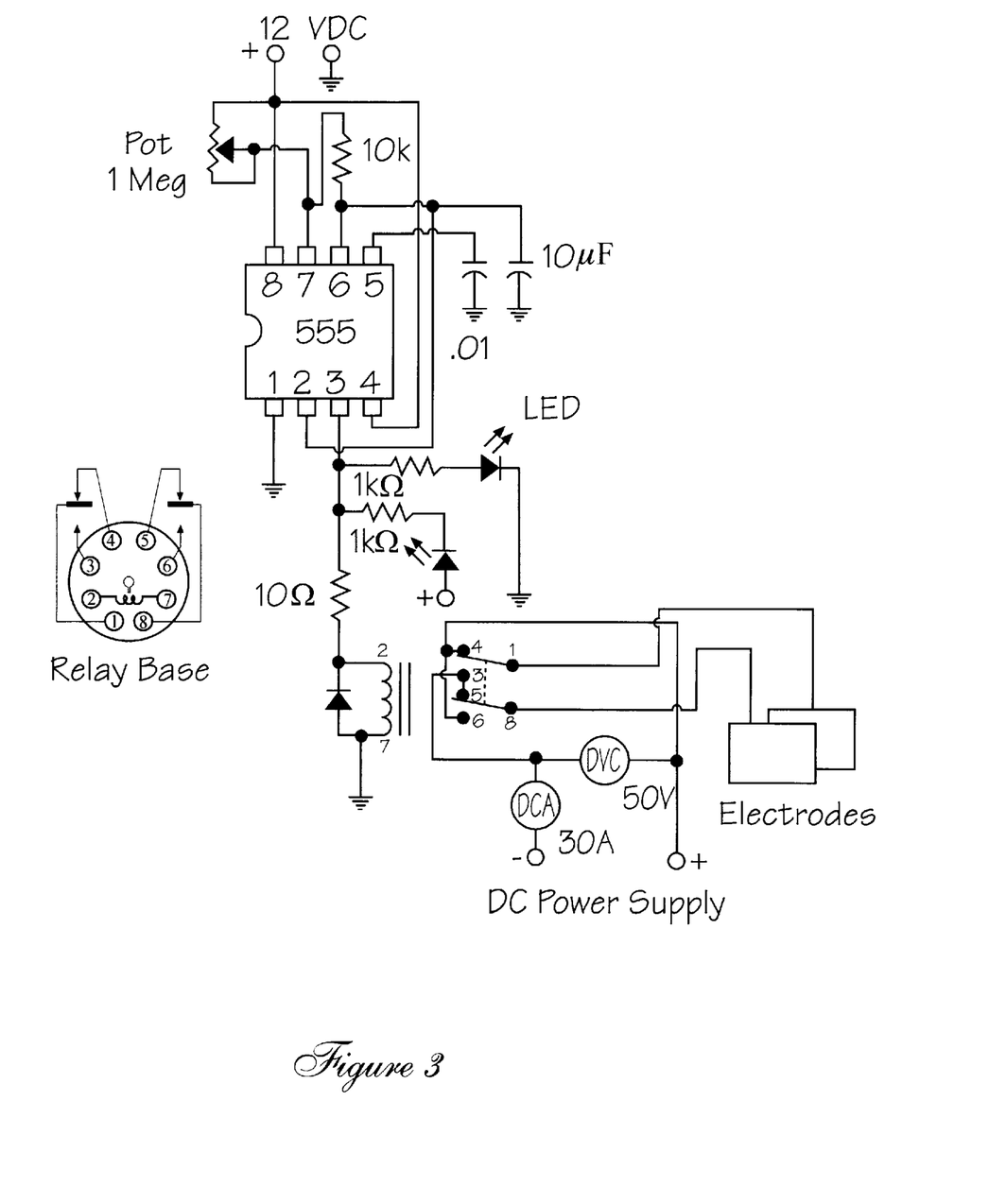
FIG. 3 schematically depicts an automatic polarity reversing electrical circuit of the present invention.

AC current is optionally supplied by circuitry disclosed in FIG. 3.

EXAMPLE 2

Steam Extraction Pre-treatment—A steam extraction pre-treatment step was utilized to remove PCBs from sediment taken from the St. Lawrence River adjacent to a federal Superfund site located near Massena, N.Y. Sediment consisted of fine-grained sand and mud, and was known to contain approximately 10 ppm PCBs. Steam distillation was performed on a 500 gm sample using a Nielsen-Kryger distillation unit using one liter of doubly deionized water (DDI). Water was incrementally replaced and a total volume of 2 liters of DDI water was distilled at a rate of approximately 150 milliliters per hour. Condensate was collected in a separatory funnel and subsampled every 250 milliliters by draining the bottom 200 milliliters from the funnel for aqueous phase PCB concentration and the remaining 50 milliliters for any oil phase (observed floating on the water). Visual observation of the initial distillation experiments indicated that small amounts of clear yellow oil formed in the condensate and white crystals on glassware surfaces. The oil floated on the top of the water suggesting it was not pure phase PCBs; however, concentrations in small oil samples were as much as 12% PCBs by weight. During this experiment the top 50 of each 250 milliliter subsample was analyzed separately from the underlying water. PCB water concentrations varied from 531 to 151 ppb. The water + oil condensate varied from 36.6 to 0.4 ppm. In both instances the PCB concentrations generally decreased with each successive extraction. However, at a cumulative volume of 1 liter, an increase in PCB concentration is noted perhaps related to thermal destruction of an organic PCB carrier phase in the sediment.

Approximately 4.33 mg of PCBs were present in the initial sediment sample. PCB analysis after steam distillation was 0.38 mg (91.2% extraction). At the end of the extraction approximately 500 milliliters of water remained in contact with the sediment. The concentration of this water averaged 1.3 ppb PCB.

Monitoring of the conger specific PCB pattern before and after distillation indicated that the final sediment is enriched in the average number of total chlorines per biphenyl (CL/BP) by approximately 20% relative to starting sediment (3.1 vs. 3.8). The aqueous condensate compliments this change in the sediment with lower CL/BP values (2.0–2.4). A small increase in the CL/BP value is seen in each successive condensate sample as the most volatile congeners are preferentially lost from the sediment. A similar trend is seen in the water+oil layer samples.

ECP treatment—Approximately 1 liter of PCB contaminated condensate from the steam extraction pretreatment step was added to a glass beaker and was stirred for 30 minutes. Duplicate 25 milliliter control samples were then taken and the pH of the water was adjusted to 5 with nitric acid. Nested steel pipe electrodes (2" and 1.5diameters) were immersed into the beaker (FIG. 2*b*) and the current was activated to 10 volts. The polarity of the electrodes was switched every five seconds. The initial pH, temperature, and amperage was measured. One milliliter of heated (70 C) 3% hydrogen peroxide solution (approximately 43 ppm based on condensate weight) was added and allowed to react. Hydrogen peroxide concentrations, temperature, pH, and amperage were monitored at five minute intervals. Once the hydrogen peroxide concentration dropped below 1 ppm an additional dose of hydrogen peroxide was added and the experimental parameters monitored. This was done three times corresponding to a total hydrogen peroxide dose of approximately 130 ppm. The cumulative treatment time was thirty minutes.

The starting concentration of the aqueous phase PCBs was 181.5 ppb. After ten minutes of ECP treatment, the concentration of duplicate 25 milliliter subsamples was reduced to 26.7 ppb. After the third and final treatment (thirty minutes) the concentration was 9.0 ppb, a reduction of 95%. During the treatment the pH of the solution varied from 3.2 to 5.5, while the temperature of the solution steadily climbed from 16.8 to 22.3 C. Acidic spikes are thought to be a function of Fenton's Reagent reactions with the addition of hydrogen peroxide and the temperature rise a function of the exothermic nature of the reaction. The current dropped after the initial treatment to 0.75 amperes but remained relatively constant at 1.0 amp afterwards.

During the ECP treatment of the aqueous phase condensate an increase in the CL/BP value in the surviving PCB fraction was noted (2.24–3.63) suggesting preferential destruction of lower chlorinated PCBS. In addition, orthochlorinated PCBs were preferentially destroyed. These data suggest anaerobically biodegraded sediments with abundant lower and orthochlorinated PCB congeners, lesser chlorinated arochlors, and liquids in contact with contaminated PCB solids will be particularly susceptible to destruction by ECP processes.

EXAMPLE 3

Sample Preparation

A condensate sample was obtained by steam distillation of a sediment collected from a small embayment of the St.

Lawrence River adjacent to the General Motors Federal Superfund Site and the Akwesasne Mowhawk Nation. This sediment was contaminated by anaerobically degraded Alochlor 1248. A second condensate was obtained by steam distillation of a soil collected from the Mare Island Naval Base in California. This soil sample was contaminated by a mixture of Alochlors 1254 and 1260 with no evidence of biodegradation. To obtain the PCB-containing condensates from the St. Lawrence sediment and the California soil, a modified Nielsen-Kryger Apparatus was used as described by G. Veith and L. Kiwus in the Bulletin of Environmental Contamination and Toxicology, volume 17 pages 631–636. Five hundred grams of St. Lawrence sediment or 738 grams of California soil were placed into the apparatus with double distilled deionized water. The water was boiled off and the condensate collected. Two liters of condensate was collected for the St. Lawrence sediment (182 micrograms/L) and 3.02 liters from the California soil (122 micrograms/L). The condensates were stored in amber bottles at 4 C until used.

ECP Experiments

One liter of the St. Lawrence condensate was adjusted to pH 5 using Nitric Acid and placed in an ECP reactor having a nested pipe configuration of electrodes. The temperature of the condensate was 16.8 C. A current of 1000 mA was induced across the electrodes and hydrogen peroxide solution maintained at 70 C was added to the condensate to yield a concentration of 43 mg/L. After a period of ten minutes another portion of hydrogen peroxide solution added to the condensate. After another ten minutes a third portion of hydrogen peroxide solution was added to the condensate. During the entire 30 minute period the current was maintained at 1000 mA. At the conclusion of this reaction period the condensate was analyzed for residual PCB content and it was determined to be 9.1 micrograms/L (equivalent to a 95% decrease).

Twelve hundred milliliters of the California condensate was adjusted to pH 2 using Nitric Acid and placed in an ECP reactor having a nested pipe configuration of electrodes. The temperature of the condensate was 20 C. Addition of 280 mg ferrous sulfate was then added to the condensate. A current of 1200 mA was induced across the electrodes and hydrogen peroxide solution maintained at 70 C was added to the condensate to yield a concentration of 43 mg/L. After a period of ten minutes another portion of hydrogen peroxide solution added to the condensate. During the entire 20 minute period the current was maintained at 1200 mA. At the conclusion of this reaction period the condensate was analyzed for residual PCB content and it was determined to be 42.1 micrograms/L (equivalent to a 65.6% decrease).

Both condensates showed preferential destruction of lower and orthochlorinated congeners. The St. Lawrence sediment was enriched in these congeners through anaerobic degradation and was therefore more susceptible to ECP than the California condensate.

It will be appreciated that the instant specification and examples are set forth by way of illustration and not limitation, and that various modifications and changes may be made without departing from the spirit and scope of the present invention.

We claim:

1. A process for decontaminating liquid media, comprising the steps of:
    a) providing a plurality of sacrificial iron or mild steel electrodes contained in an electrolytic cell, said cell having an inlet and outlet for the passing contaminated liquid media through said cell,
    b) introducing said contaminated liquid media through said inlet to immerse said electrodes,
    c) maintaining said liquid media at ambient room temperature,
    d) applying a current across said electrodes at a voltage of 0.5 to 15 volts and a current density of about 0.002–0.05 A/cm2 through said contaminated liquid media, said current possessing alternating phase changes with a polarity reversal rate of 0.01–5 cycle/second, the amount of said current being controlled by the limitation that the concentration of the dissolved ferrous ion generated from said sacrificial iron or steel electrodes does not exceed the solubility constant at the liquid pH, Eh and temperature; and
    e) injecting a heated hydrogen peroxide liquid solution into said contaminated liquid media via continuous or sequential injections at a plurality of sites in the proximity of said immersed electrodes.

2. A process for decontaminating liquid media, comprising the steps of:
    a) providing a plurality of sacrificial iron or mild steel electrodes contained in an electrolytic cell, said cell having an inlet and outlet for the passing contaminated liquid media through said cell,
    b) introducing said contaminated liquid media through said inlet to immerse said electrodes,
    c) maintaining said liquid media at ambient room temperature,
    d) applying a current across said electrodes at a voltage of 0.5 to 15 volts and a current density of about 0.002–0.05 A/cm2 through said contaminated liquid media, said current possessing oscillating direct current, the amount of said current being controlled by the limitation that the concentration of the dissolved ferrous ion generated from said sacrificial iron or steel electrodes does not exceed the solubility constant at the liquid pH, Eh and temperature; and
    e) injecting a heated hydrogen peroxide liquid solution into said contaminated liquid media via continuous or sequential injections at a plurality of sites in the proximity of said immersed electrodes.

3. The process as described in claim 1, wherein said sacrificial iron or steel electrodes comprise cast iron or mild steel.

4. The process as described in claim 1, wherein said contaminated liquid media comprises wastewater, ground water, surface water, aqueous suspensions of sludges, soils, and sediments containing pollutants.

5. The process as described in claim 4, wherein said pollutants comprise at least one from a group of PCB, VOC, BTX aromatic hydrocarbons, petroleum hydrocarbons, trace metals, radionuclides, pesticides, phenolics, halogenated hydrocarbons, organometallics, and pathogenic microorganisms.

6. The process as described in claim 5, wherein the amount of said current in step (d) maintains the concentration of dissolved ferrous ions, generated from said sacrificial iron or steel electrodes, below the solubility limit of the treated contaminated liquid media.

7. The process as described in claim 1, wherein addition of said heated hydrogen peroxide is injected at <100 ppm based on w/w of said heated hydrogen peroxide to said contaminated liquid media.

8. The process as described in claim 1, wherein the pH of said contaminated liquid media is adjusted to about 2 to about 6 prior to performing step d).

9. The process as described in claim 1, further comprising the step:

f) removing purified effluent from said outlet.

10. The process according to claim 6, wherein the residence time of said contaminated liquid media within said electrolytic cell is less than 5 minutes.

11. The process according to claim 10, wherein the extent of decomposition of said contaminated liquid media within said electrolytic cell is greater than 85%.

12. The process as described in claim 9, wherein said purified effluent from step (f) is subjected to a post treatment wherein said purified effluent is separated from insolubles and flocculants.

13. The process as described in claim 12, wherein said purified effluent is separated from said insolubles and flocculants by means of gravity, filtration or centrifugation.

14. The process as described in claim 1, wherein a co-solvent is added to said contaminated liquid media in step (d) wherein said liquid media contains greater than 0.1% solids.

15. The process as described in claim 1, wherein said electrolytic cell is placed in an existing groundwater well and said decontamination process is performed in situ in said well.

16. The process as described in claim 1, wherein a desorption prestep is employed prior to step (a) for the purpose of increasing the concentration of dissolved organic compounds by desorbing said organics and organometallics from sediments.

17. The process as described in claim 16, wherein said desorption step comprises steam distillation.

18. The process as described in claim 1, further comprising the step:

f) cleaning said electrodes by periodically applying high amperage currents across said electrodes.

19. The process as described in claim 1, wherein said electrodes are substantially uniformly spaced parallel sheets or nested pipes.

20. The process as described in claim 1, wherein the process steps are performed batchwise or in a continuous mode.

* * * * *